July 31, 1956  J. R. FURRER  2,756,688
REVERSIBLE SUSPENSION FOR RAILWAY CARS
Filed Oct. 19, 1951  5 Sheets-Sheet 1
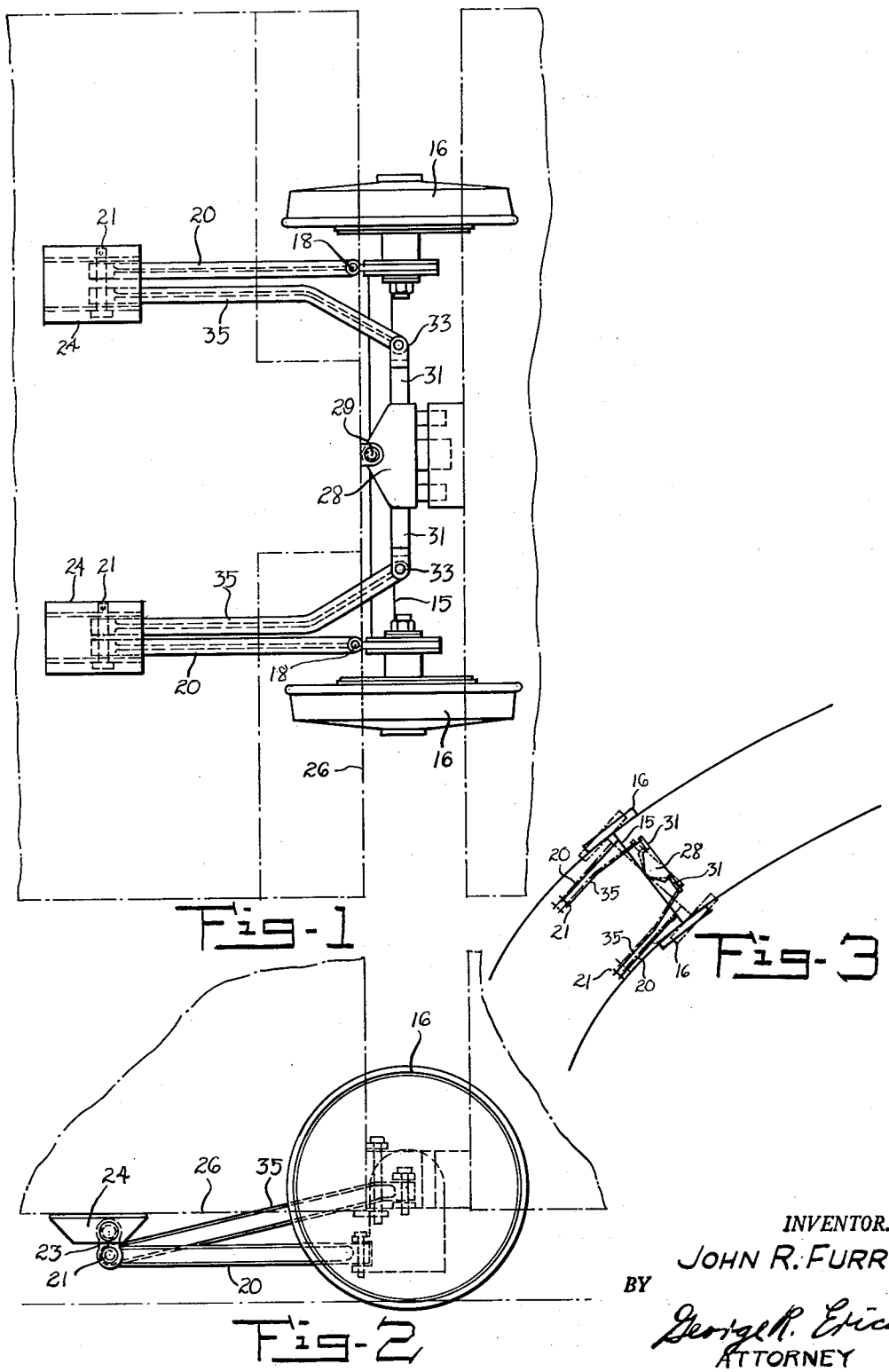
INVENTOR.
JOHN R. FURRER
BY
*George R. Ericson*
ATTORNEY July 31, 1956  J. R. FURRER  2,756,688
REVERSIBLE SUSPENSION FOR RAILWAY CARS
Filed Oct. 19, 1951  5 Sheets-Sheet 2

INVENTOR.
JOHN R. FURRER
BY
George R. Ericson
ATTORNEY

July 31, 1956   J. R. FURRER   2,756,688
REVERSIBLE SUSPENSION FOR RAILWAY CARS
Filed Oct. 19, 1951   5 Sheets-Sheet 3
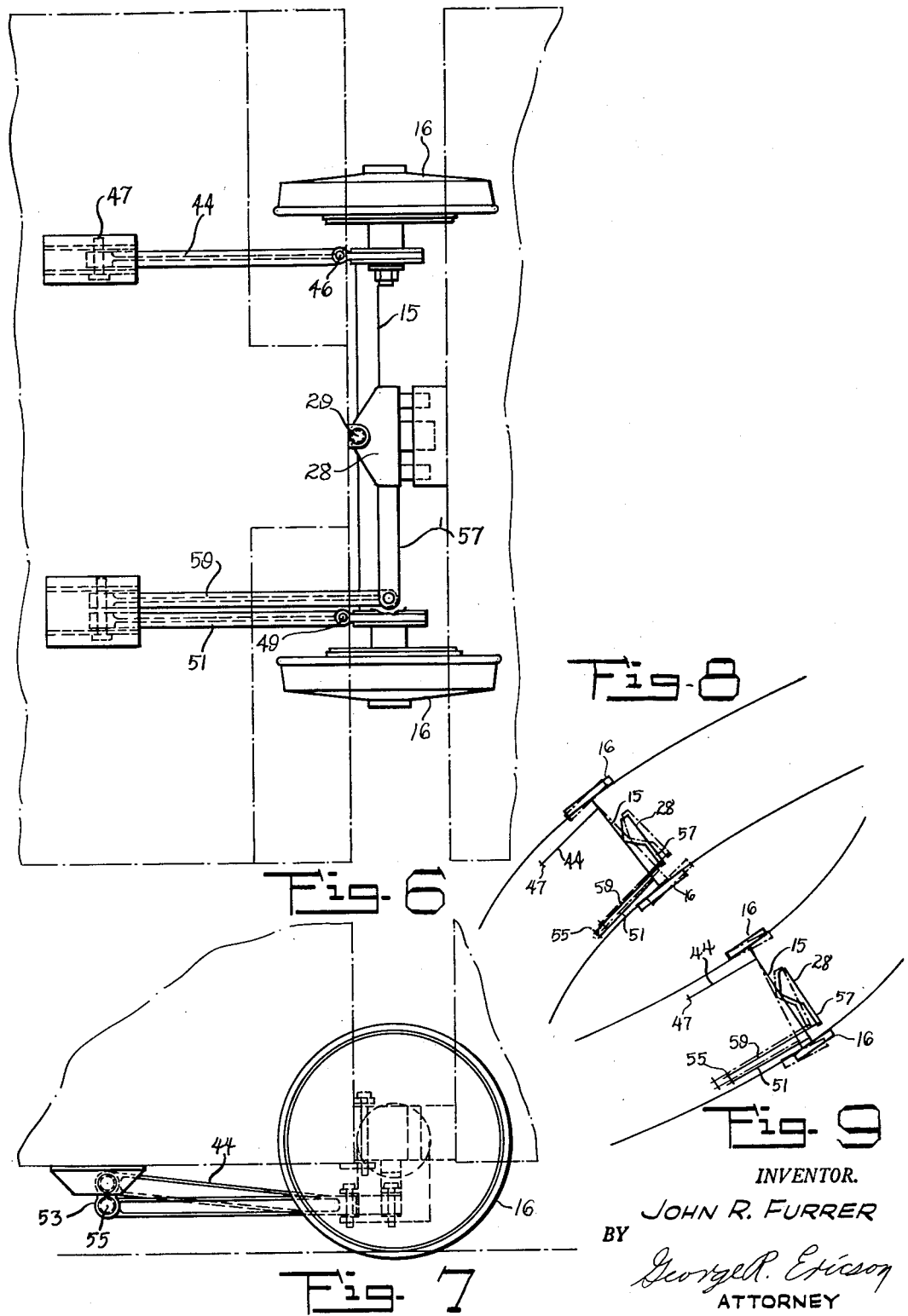
INVENTOR.
JOHN R. FURRER
BY
George R. Ericson
ATTORNEY July 31, 1956  J. R. FURRER  2,756,688
REVERSIBLE SUSPENSION FOR RAILWAY CARS
Filed Oct. 19, 1951  5 Sheets-Sheet 4

INVENTOR.
JOHN R. FURRER
BY
George P. Ericson
ATTORNEY

July 31, 1956  J. R. FURRER  2,756,688
REVERSIBLE SUSPENSION FOR RAILWAY CARS
Filed Oct. 19, 1951  5 Sheets-Sheet 5

INVENTOR.
JOHN R. FURRER
BY
George R. Ericson
ATTORNEY

United States Patent Office 2,756,688
Patented July 31, 1956

2,756,688

REVERSIBLE SUSPENSION FOR RAILWAY CARS

John R. Furrer, Milwaukee, Wis., assignor to ACF Industries, Incorporated, a corporation of New Jersey Application October 19, 1951, Serial No. 252,113

3 Claims. (Cl. 105—4)

This invention relates to suspensions for railway cars composed of a plurality of coupled articulated two-wheeled trailer units, and consists particularly in suspension arrangements whereby such articulated cars may be safely operated at high speeds in either direction.

In cars of this type heretofore constructed it has been the practice to secure the axle structure to the body framing normal to the longitudinal axis of the body, supporting the unwheeled front end of one trailer unit on the wheeled rear end of the adjacent trailer unit. This resulted in the car wheels always being directed toward the inner rail on curves, and although this was desirable in that it eliminated the tendency of the wheels to climb the outer rail, it was disadvantageous in that if the train were reversed, the wheels would attack the rails at a positive angle, thereby tending to climb the outer rail of curves. Consequently, cars of this type have not been reversible.

It is therefore an object of this invention to provide a reversible articulated railway car consisting of a plurality of coupled two-wheeled units.

It is a further object to provide suspension means for automatically directing the wheels of such cars so that the vertical plane through the flange will be at all times substantially tangential to the track rails, whereby the cars may operate safely in either direction on curved track.

These and other objects of the invention will be apparent to those skilled in the art from a study of the following description and accompanying drawings, in which:

Fig. 1 is a plan view of mechanism for constantly providing tangential relationship between car wheels and rails.

Fig. 2 is an elevation view of the mechanism shown in Fig. 1.

Fig. 3 is a diagrammatic view illustrating operation of the mechanisms of Figs. 1 and 2.

Fig. 6 is a plan view of a modified linkage mechanism for automatically providing the desired axle angularity.

Fig. 7 is an elevational view of the mechanism illustrated in Fig. 6.

Figs. 8 and 9 are diagrammatic views showing operation of the mechanism of Figs. 6 and 7.

Figure 4:
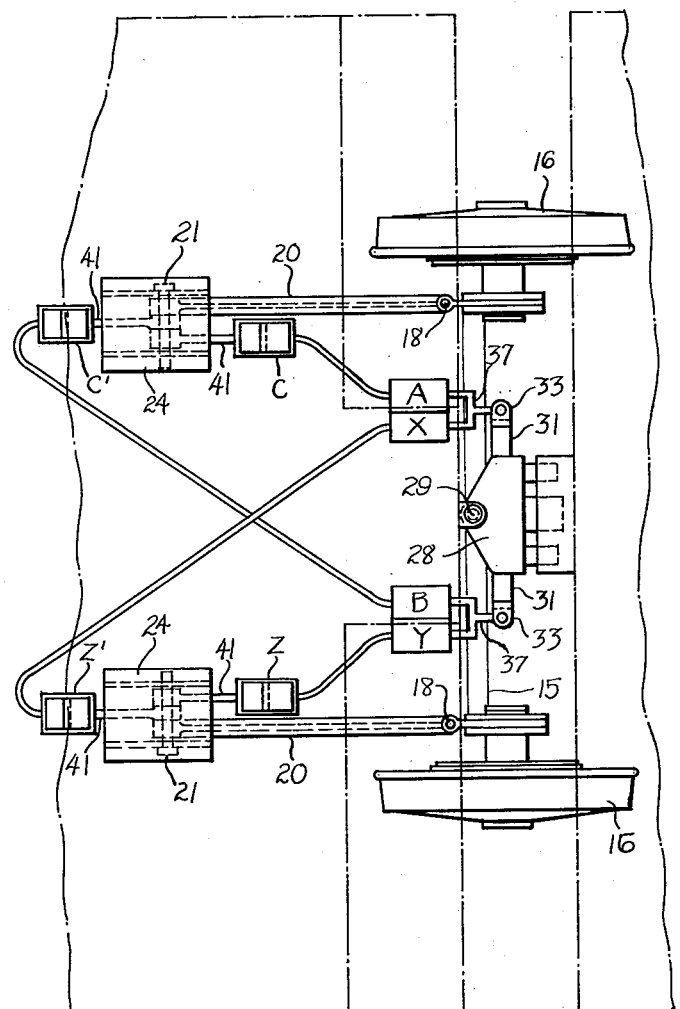
Fig. 4 is a plan view of hydraulic mechanism for providing the desired tangential wheel-rail relationship.

Referring now to the drawing, numeral 15 refers to a drop axle structure on either end of which are journalled flanged wheels 16. Axle structure 15 is provided near its ends with a pair of vertical pivots 18 to which are pivotally secured radius rods 20. Radius rods 20 are horizontally pivoted at their opposite ends at 21 from the lower end of swing hangers 23, which are pivotally secured to brackets 24 depending from the bottom of car body 26. A coupler member 28 is pivotally secured as at 29 to the end of the car body. Coupler 28 is formed with a pair of lateral extensions 31 having bifurcated ends 33, and links 35 are pivotally secured in the bifurcated ends 33 and at their other end to the common pivot 21 of swing hangers 23, so that when coupler 28 is centered for operation on straight track as shown in Fig. 1, the linkages consisting of links 35, pivot pins 21 and radius rods 20 retain the car axle in the transverse position shown in Fig. 1. Operation of the device is best shown in Fig. 3 in which dotted lines represent the relative positions of the coupler linkages and axle structure for straight track operation as shown in Fig. 1. Solid lines in Fig. 3 show that as the coupler member 28 is rotated to conform to track curvature, left hand link 35 pulls swing hanger 23 and left hand radius rod 20 outwardly toward the end of the car, thereby urging the end of the axle and the wheel on the outside of the curve outwardly from the end of the car. Similarly, right hand link 35 is urged inwardly by coupler 28 thereby moving swing hanger 23 inwardly and causing a corresponding inward movement of radius rod 20, the inside end of axle structure 15 and inside track wheel 16. The proportions of the linkages are such that movements of the coupler will at all times cause positioning of the wheels so that the plane of their flanges is tangential to the track rails.

Figure 5:
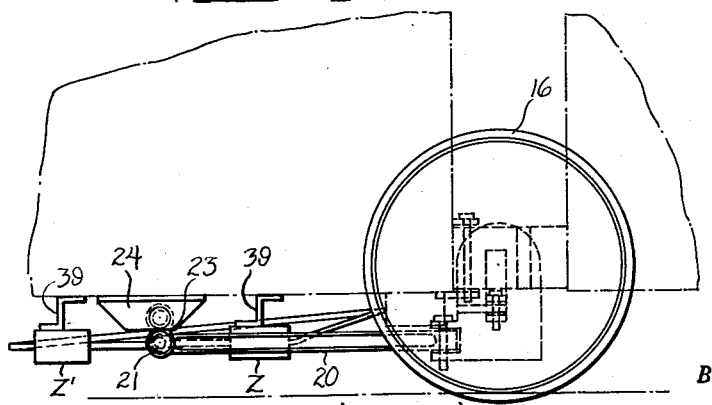
Fig. 5 is an elevational view of the hydraulic mechanism of Fig. 4.

A hydraulic arrangement functioning similarly with the linkage arrangement of Figs. 1 and 2 is illustrated in Figs. 4 and 5 in which reference characters 15—33 refer respectively to the same elements as in Figs. 1 and 2. Adjacent each lateral extension 31, a pair of hydraulic cylinders, A and Y, and B and X, are fixed to the bottom of the car body. The pistons of cylinders A and Y, and B and X, are pivotally connected to the adjacent ends of coupler extensions 31 by branched links 37. Cylinder A is connected by a hydraulic line to cylinder C, mounted under the car body by means of a bracket 39. The plunger 41 of cylinder C is pivotally connected to pivot pin 21 of swing hanger 23 so that when coupler 28 is rotated counter-clockwise, fluid is forced from cylinder A into cylinder C so as to urge upper radius rod 20 and inner wheel 16 inwardly toward the car body. Cylinder Y is connected by a hydraulic line to cylinder Z', the plunger of which is pivotally connected to the pivot pin 21 of the opposite swing hanger, so that when the coupler member is rotated counter-clockwise as in rounding curves, fluid is forced from cylinder Y into cylinder Z', thereby urging lower radius rod 20 and outside wheel 16 outwardly from the end of the body. Cylinders X and B are similarly connected respectively to cylinders Z and C' whereby responsive to clockwise movements of the coupler, lower track wheel 16 will be drawn inwardly towards the body and upper wheel 16 pushed outwardly from the end of the body. By providing a proper ratio between the effective area of the master cylinders A, B, X, and Y and their respective servo-cylinders C, C', Z and Z', the correct angularity of the axle and desired tangential wheel-rail relationship may be achieved at all times regardless of the radius or direction of curvature.

A third mechanism for providing the desired angularity of the axle is shown in Figs. 6 and 7. One end (uppermost in the drawing) of axle 15 is secured to the car body by a radius rod 44 which is secured to the axle by vertical pivot 46 and at the other end is secured to the body by horizontal pivot means 47. Axle structure 15 is formed with vertical pivot means 49 at its opposite end (lower part of Fig. 6) and a radius rod 51 is pivotally connected thereto. The opposite end of radius rod 51 is pivotally suspended from the car body by a swing hanger 53 having a lower pivot 55. Coupler 28 is pivotally mounted on the car as at 29 and is formed with a lateral extension 57. A link 59 is pivotally connected at one end to coupler extension 57 and at the other end to pivot pin 55 of swing hanger 53 so that counterclockwise movements of coupler 28 are transmitted through extension 57, link 59, pivot pin 55, swing hanger 53 and radius rod 51, causing axle structure 15 to be rotated outwardly about pivot 46, as best shown diagrammatically in Fig. 9. Conversely, clockwise movements of coupler 28 rotate the axle inwardly about pivot 46, as best shown diagrammatically in Fig. 8. It is obvious that the relative proportions of the linkages may be varied in order to provide the desired resultant tangential relation between the wheels and rails when the vehicle is rounding curves.

Figure 10:
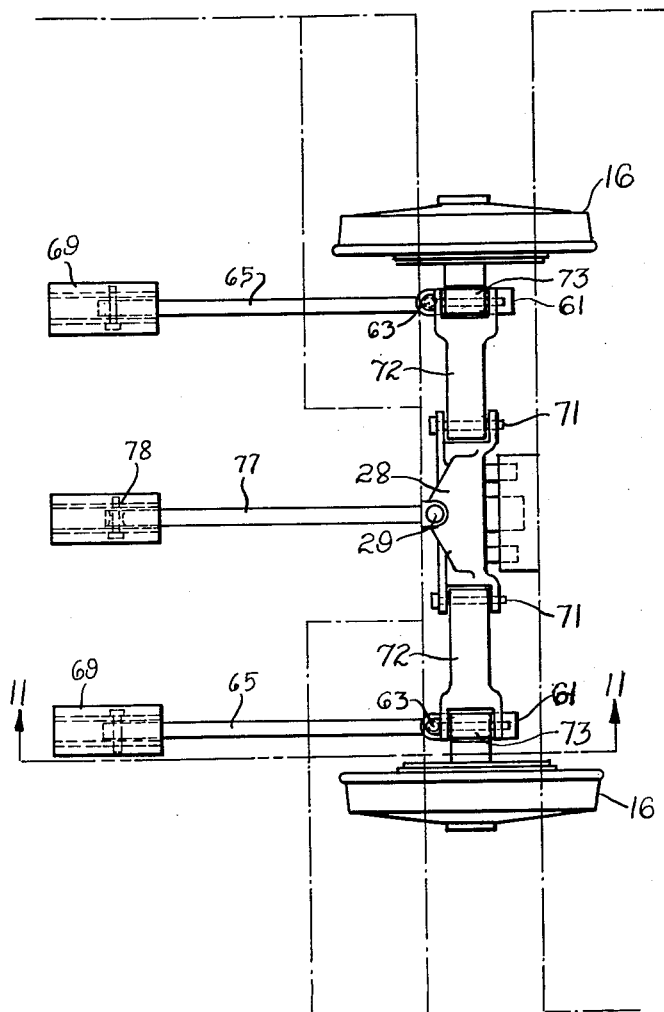
Fig. 10 is a plan view of another modified linkage mechanism for guiding the axle.
Figure 11:
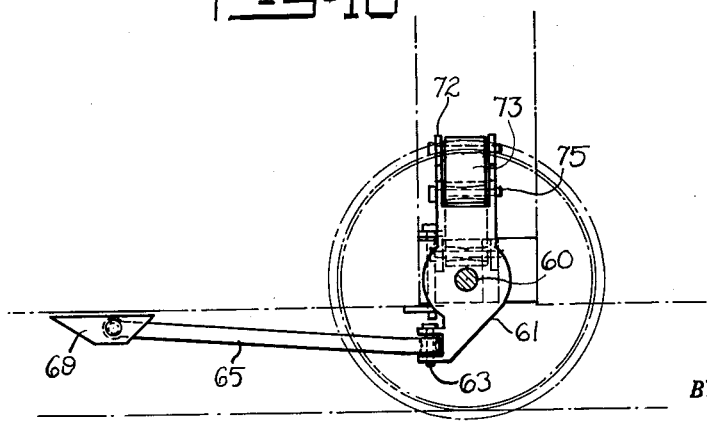
Fig. 11 is a view along the line 11—11 of Fig. 10.
Figure 12:
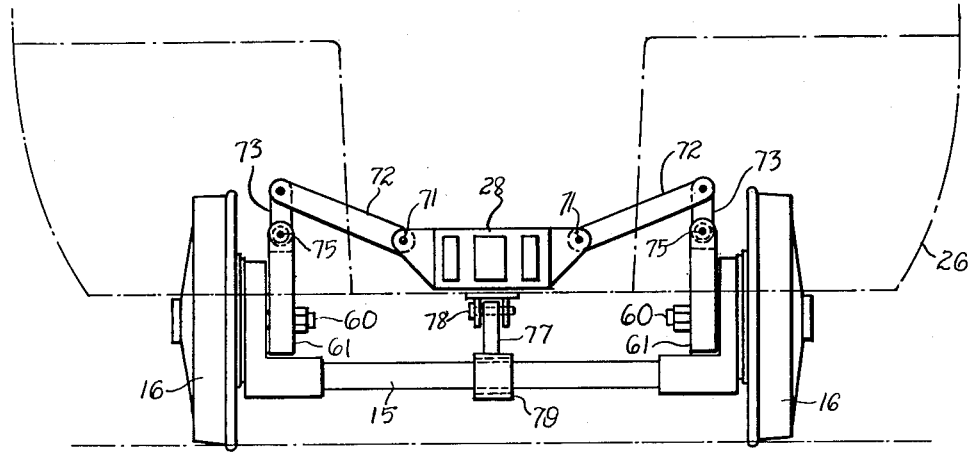
Fig. 12 is an end view of the mechanism of Figs. 10 and 11.

A fourth modification of the invention is shown in Figs. 10, 11, and 12. The mechanism of Figs. 10, 11, and 12 includes a drop axle 15 substantially as described above, which provides a mounting for track wheels 16 on stub axles 60, on which are also rotatably mounted guide members 61. The lower end portions of members 61 are provided with a vertical pivot means 63, to which is pivotally secured radius rod 65, the opening in radius rod 65 being substantially larger than pivot pin 63 to permit the interposition therebetween of a rubber bushing. The purpose of the rubber bushing is to permit limited rotation of member 61 with respect to radius rod 65. The opposite end of radius rod 65 is mounted on a horizontal pivot secured to the vehicle body by bracket 69. Coupler 28 is secured to the ends of the body by pivot means 29 and is formed with pivot means 71 on each side. A linkage comprising laterally extending links 72 and vertically extending links 73 connects pivot means 71 to a pivot 75 on the upper portion of guide members 61. Although pivots 75 are horizontal, it will be noted that limited universal movement is permitted between links 73 and pivot 75 by a rubber bushing interposed between the pivot pin and member 61. A stabilizing link 77 is pivotally secured to the body at one end as at 78 and to the axle at the other end as at 79, thereby to restrict longitudinal displacement of the axle center with respect to the car body. In operation, this mechanism functions as follows: When the car rounds a curve such that coupler 29 is rotated counter-clockwise, as best seen in Fig. 10, link 72 (the lower one in Fig. 10) moves outwardly from the car body causing a similar outward movement of the upper portion of guide member 61, and the opposite link 72 moves inwardly, thereby causing similar inward movement of the upper end of its cooperating guide member 61. Hence, since the position of the lower pivots 63 of guide members 61 are fixed longitudinally, it will be seen that the wheel 16 on the outer rail of the curve is urged outwardly from the car body whereas the inner wheel is urged inwardly toward the car body, so that the wheels are directed tangentially to the rails. Conversely, the same procedure is automatically repeated when the train rounds a curve in the opposite direction in which the coupler is rotated clockwise.

This invention may be modified in various respects as will occur to those skilled in the art, and exclusive use is contemplated of all modifications as come within the scope of the appended claims.

What is claimed is:

1. In an articulated railway train, the combination of a plurality of coupled two-wheeled units each unit having an axle structure and a body structure movably supported on said axle structure, flanged track wheels supporting said axle structure, coupler means pivotally mounted on said body structure, a radius rod pivotally connected at one end thereof to said axle structure adjacent one end thereof and suspended at the other end thereof from said body structure for limited longitudinal movement with respect thereto, a second radius rod similarly connected to said axle structure adjacent the other end thereof and similarly suspended from said body structure, a link pivotally connected at one end thereof to said coupler means and operatively connected at the other end thereof to one of said radius rods for moving the same longitudinally with respect to said body structure in response to pivotal movement of said coupler means with respect to said body structure, and a second link pivotally connected at one end thereof to said coupler means and operatively connected at the other end thereof to the other of said radius rods for moving the same longitudinally with respect to said body structure in response to pivotal movement of said coupler means with respect to said body structure, whereby the movement of said axle structure with respect to said body structure is controlled to continuously maintain the vertical planes of said wheel flanges substantially tangential to the track rails.

2. In an articulated railway train including a plurality of coupled two-wheeled units each having an axle structure, a body structure movably supported on the axle structure, and flanged track wheels supporting the axle structure; axle guiding mechanism comprising, in combination, coupler means for connecting adjacent units consisting of two rigidly connected detachable parts, one of which is pivotally mounted on one of said adjacent units and the other of which is fixedly mounted on the other of said units, a radius rod pivotally connected at one end thereof by a vertical pivot to said axle structure adjacent one end thereof and suspended by hanger means at the other end thereof from said unit carrying said pivotally mounted coupler part for limited longitudinal movement with respect to said unit, a link pivotally connected at one end thereof to said pivotally mounted coupler part laterally with respect to its pivot and operatively connected at the other end thereof through said hanger means to said radius rod for moving said rod longitudinally with respect to the body structure in response to pivotal movement of said pivotally mounted coupler part with respect to the body structure by said fixedly mounted coupler part whereby said rod is movable longitudinally of said body to steer the axle structure for continuously maintaining the vertical planes of the wheel flanges substantially tangential to the track rails.

3. In an articulated railway train, the combination of two adjacent units, a draft coupler connecting said units and consisting of two detachable parts, one of which is pivotally mounted on the first unit and the other of which is fixedly mounted on the second unit, an arm fixed on the pivoted part of the coupler so that it maintains a fixed angle with the second unit when coupled thereto, a running gear supporting the adjacent ends of the two units and comprising an axle structure and track wheels journalled on said axle structure, and axle structure steering mechanism connected at one end thereof to said axle structure adjacent one end thereof, and at the other end to said fixed arm, and connected at a point intermediate the two end connections to said first unit, for actuation by changes in the angle between said first unit and said fixed arm, whereby the coupler constitutes the sole axle guiding connection between the two units.

References Cited in the file of this patent
UNITED STATES PATENTS

| | | |
|---|---|---|
| 742,380 | Barth | Oct. 27, 1903 |
| 1,954,705 | Kruckenberg | Apr. 10, 1934 |
| 2,098,949 | Geissen | Nov. 16, 1937 |
| 2,604,857 | MacVeigh | July 29, 1952 |